(12) United States Patent  (10) Patent No.: US 7,483,164 B2
Nakazono et al.  (45) Date of Patent: Jan. 27, 2009

(54) IMAGE PROCESSING APPARATUS

(75) Inventors: Keisuke Nakazono, Hino (JP); Akira Ueno, Akiruno (JP); Dai Kawase, Hino (JP)

(73) Assignee: Olympus Corporation, Tokyo (JP)

( * ) Notice: Subject to any disclaimer, the term of this patent is extended or adjusted under 35 U.S.C. 154(b) by 872 days.

(21) Appl. No.: 10/858,592

(22) Filed: Jun. 2, 2004

(65) Prior Publication Data

US 2004/0257617 A1    Dec. 23, 2004

(30) Foreign Application Priority Data

Jun. 19, 2003   (JP) .............................. 2003-174246

(51) Int. Cl.
*G06F 15/00*   (2006.01)
(52) U.S. Cl. ..................... 358/1.16; 358/444; 358/1.17; 358/523
(58) Field of Classification Search ................. 358/444, 358/1.16, 1.17, 523
See application file for complete search history.

(56) References Cited

U.S. PATENT DOCUMENTS 5,784,178 A * 7/1998 Tsai et al. ................... 358/482
6,690,378 B1 * 2/2004 Kohashi et al. ............. 345/532
6,721,010 B1 * 4/2004 Chen et al. .................. 348/322

FOREIGN PATENT DOCUMENTS

JP    2002-236460    8/2000

* cited by examiner

*Primary Examiner*—Houshang Safaipour
*Assistant Examiner*—Michael Burleson
(74) *Attorney, Agent, or Firm*—Straub and Pokotylo; John C. Pokotylo

(57) ABSTRACT

Disclosed herein is an image processing apparatus having a memory to store taken image data, for effecting image processing on the stored image data, including: an image data storage control section for outputting block data end signals indicating data end of blocked image data in synchronization with the storing of the taken image data into the memory; and an image processing section having a stored a mount counting section for counting amount of the taken image data stored into the memory based on the block data end signals, and a processing progress control section for controlling the progress of the image processing based on the stored a mount counted at the stored amount counting section.

6 Claims, 5 Drawing Sheets

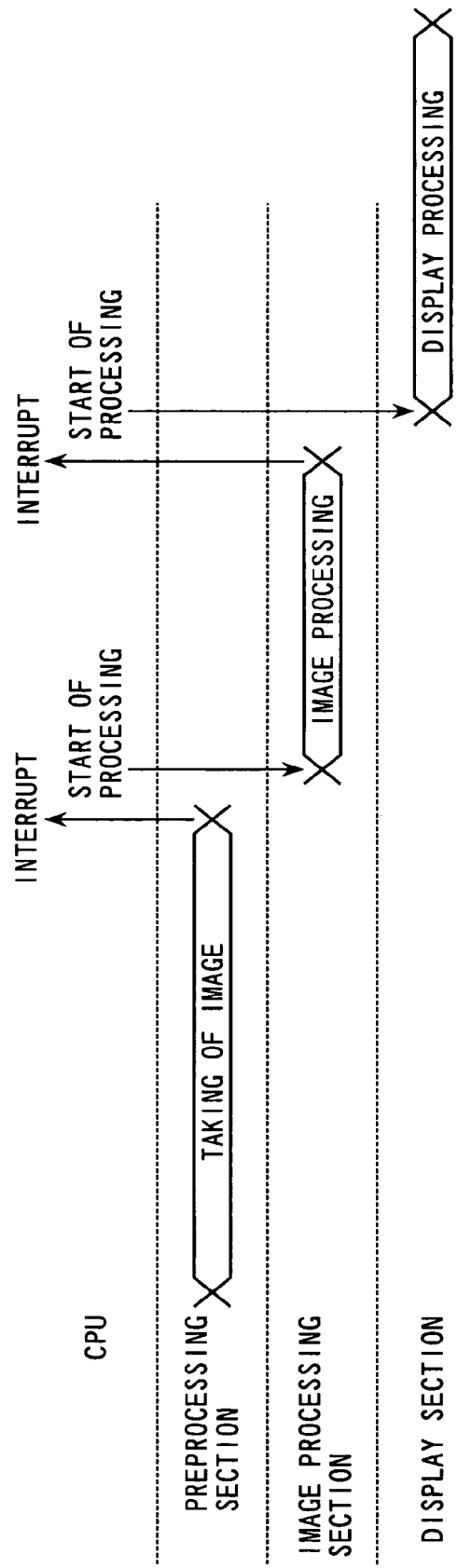

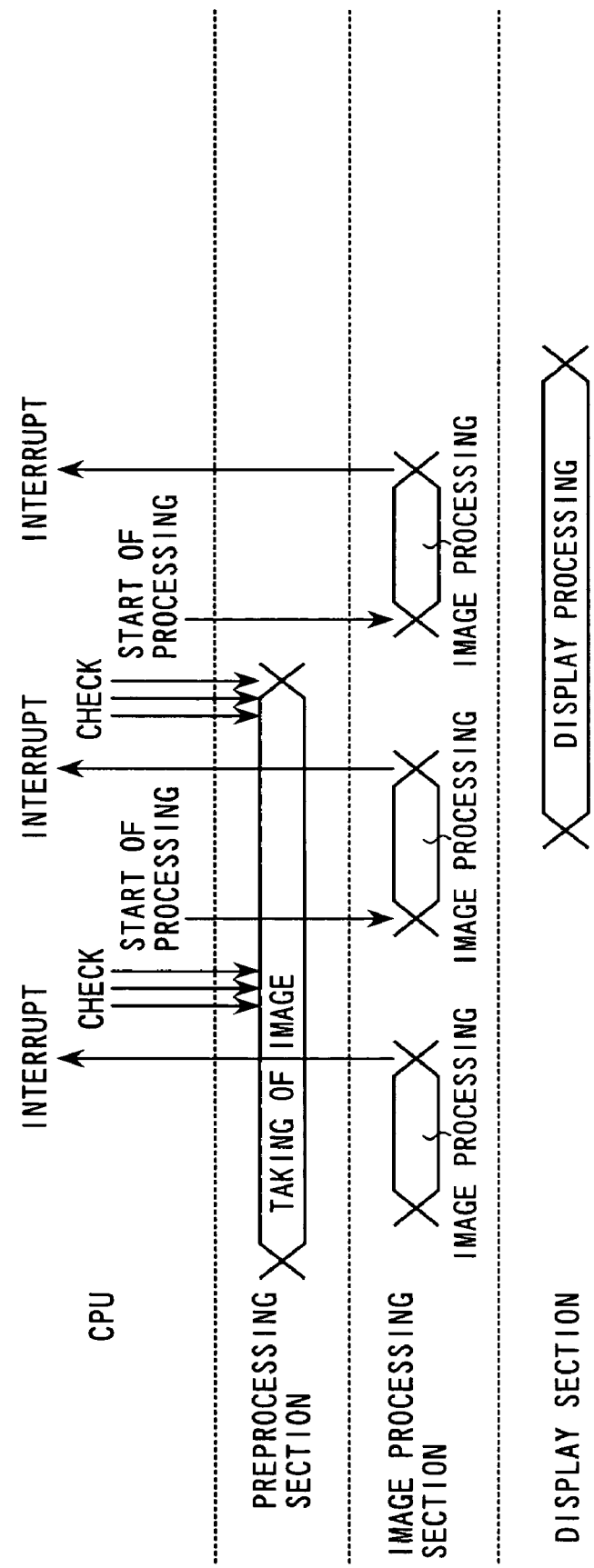

IMAGE PROCESSING APPARATUS

This application claims benefit of Japanese Patent Application No. 2003-174246 filed in Japan Jun. 19, 2003, the contents of which are incorporated by this reference.

BACKGROUND OF THE INVENTION

The present invention relates to image processing apparatus which store taken image data into a memory and effect image processing on the stored image data.

In general, those constructed as shown in FIG. 1A are known as the image processing apparatus for effecting image processing on taken image data. In FIG. 1A, numeral 101 denotes an imaging device such as CCD. An image data acquired by the imaging device 101 is subjected, as preprocessing, to such simple processing as a simple WB processing, OB subtraction and knee processing at a preprocessing section 102. Subsequently, after subjected to the main image processing such as YC image generation and resizing at an image processing section 103, it is outputted for example onto a TFT monitor through a display section 104. Denoted by numeral 105 is the CPU for controlling each section.

In thus constructed image processing apparatus, the clock rate for the imaging data generated at the imaging device 101, the processing operation clock rate at the image processing section 103, and the display operation clock rate at the display section 104 are usually different from each other. Accordingly, in the case for example of the image processing apparatus of the above construction where imaging data taken by the imaging device is directly and continuously processed to be displayed, a time lag from the taking of image to its displaying can be reduced because processing is directly effected. In this case, however, an extremely large line memory is usually required to accomplish an image processing with effecting a spatial filter processing, resulting in the problem of an increased circuit size.

By contrast, one for example disclosed in Japanese Patent Application Laid-Open 2000-236460 is known as having construction as shown in FIG. 1B where DRAM 106 is provided so that image data taken at the imaging device 101 and processed at preprocessing section 102 is once stored into DRAM 106, and the image data is then read out from DRAM 106 and transmitted to the image processing section 103 or display section 104 for an image processing or displaying.

In such a case where DRAM 106 is provided to once store the image data, adjustment of the timings of starting the processing of the image processing section 103 and display section 104 is effected by CPU 105. If the timing adjustment is to be effected frame by frame, processing is effected according to the procedure shownin FIG. 2A. In particular, taking of image data into DRAM 106 is started through the preprocessing section 102, and, when the taking of image data of one frame has been complete, the preprocessing section 102 notifies CPU 105 by an interrupt of the completion of the taking into DRAM 106. When CPU 105 is interrupted to confirm the completion of the taking of image data into DRAM 106, the processing at the image processing section 103 is started. When the image processing by the image processing section 103 has been complete, then, CPU is similarly notified by an interrupt of the completion of the image processing so that the display section 104 reads and displays the data after the image processing.

If such control technique for effecting image processing after causing DRAM 106 to store the image data corresponding to one frame is used, an extremely large line memory becomes unnecessary and load on CPU 105 is reduced. There is a problem however that time lag from the image taking to its displaying becomes greater.

To solve such problem, in a recently used technique, the image processing units of image data are divided as shown in FIG. 2B and timing adjustment is effected by the divided image processing units.

Particularly, in the procedure according to this control technique of the image processing, when the taking of image data into DRAM 106 is started through the preprocessing section 102, CPU 105 at first places the stored amount of image data under surveillance. When CPU 105 confirms that some lines of image data necessary for image processing have been stored, it starts the image processing section 103 to effect image processing. Upon completion of the processing of the predetermined image data at the image processing section 103, CPU 105 is notified of the completion of the processing by an interrupt. When CPU 105 receives the interrupt notification, CPU 105 checks again the image data amount that the preprocessing section 102 has stored into DRAM 106. After detecting that data necessary for the next image processing has been stored into DRAM 106, the image processing section 103 is started again to start the processing. Thereafter such processing procedure is repeated to process one frame.

By effecting such divided image processing, the divisionally processed image data can be transmitted to a display section without waiting for the completion of the image processing corresponding to one frame. Accordingly, it becomes possible to start display operation during the image processing of the one frame. It is thereby possible to effect image processing without requiring an extremely large line memory and at the same time with reducing time lag from the start of image taking to the displaying.

SUMMARY OF THE INVENTION

It is an object of the present invention to provide an image processing apparatus in which a narrowly divided image processing can be effected with a small-size circuit construction without control by CPU.

In accordance with a first aspect of the invention, there is provided an image processing apparatus having a memory storing taken image data, for effecting image processing on the stored image data, including: an image data storage control section for outputting block data end signals indicating data end of blocked image data in synchronization with the storing of the taken image data into the memory; and an image processing section having a stored amount counting section for counting amount of the taken image data stored into the memory based on the block data end signals, and a processing progress control section for controlling the progress of the image processing based on the stored amount counted at the stored amount counting section.

In a second aspect of the invention, the block data end signals in the image processing apparatus according to the first aspect are line end signals for indicating that image data corresponding to one line has been stored into the memory.

In a third aspect of the invention, the block data end signals in the image processing apparatus according to the first aspect are composed of line end signals for indicating that image data corresponding to one line has been stored into the memory, and frame end signals for indicating that image data corresponding to one frame has been stored into the memory.

In a fourth aspect of the invention, the stored amount counting section in the image processing apparatus according to the second aspect has one or more counters for counting the line end signals.

In a fifth aspect of the invention, the stored amount counting section in the image processing apparatus according to the third aspect has one or more counters for counting the line end signals.

In a sixth aspect of the invention, the stored amount counting section in the image processing apparatus according to the fifth aspect uses one counter when taking a still image and uses a plurality of counters with sequentially switching from one to another between each frame when taking a moving image.

In a seventh aspect of the invention, the stored amount counting section in the image processing apparatus according to the sixth aspect further includes: a counter number generator receiving and counting the frame end signals, for generating and outputting a counter number for designating a counter to be used of the counters; a first selector selecting a counter based on the designation of the counter number, for inputting the line end signals into the selected counter; and a second selector for selecting one among the outputs of the counters as a count value.

In an eighth aspect of the invention, the second selector in the image processing apparatus according to the seventh aspect is controlled based on an output of a counter output selection register to be set by CPU.

In a ninth aspect of the invention, the processing progress control section in the image processing apparatus according to the fourth or fifth aspect controls the progress of the image processing by comparing the count value of the counter with an image data amount required for image processing.

In a tenth aspect of the invention, the processing progress control section in the image processing apparatus according to the ninth aspect further includes: an image processing start line number register for retaining an image line number required for the image processing; a comparator comparing the count value with the image line number required for the image processing, for generating a wait signal when the count value is smaller than the image line number required for the image processing; and an image processing start line number register updating section for updating the image processing start line number register in accordance with an amount of image data having been subjected to image processing. The progress of the image processing is controlled based on the wait signal.

In an eleventh aspect of the invention, the image processing start line number register updating section in the image processing apparatus according to the tenth aspect includes: a memory read section for reading data stored into the memory; and an accumulating section for adding together the data read by the memory read section and the image line number required for the image processing provided as an output of the image processing start line number register to rewrite the added data to the image processing start line number register.

BRIEF DESCRIPTION OF THE DRAWINGS

FIGS. 2A and 2B each are a timing chart for explaining an example of operation of the conventional image processing apparatus shown in FIG. 1B.

DESCRIPTION OF THE PREFERRED EMBODIMENTS

Figure 3:
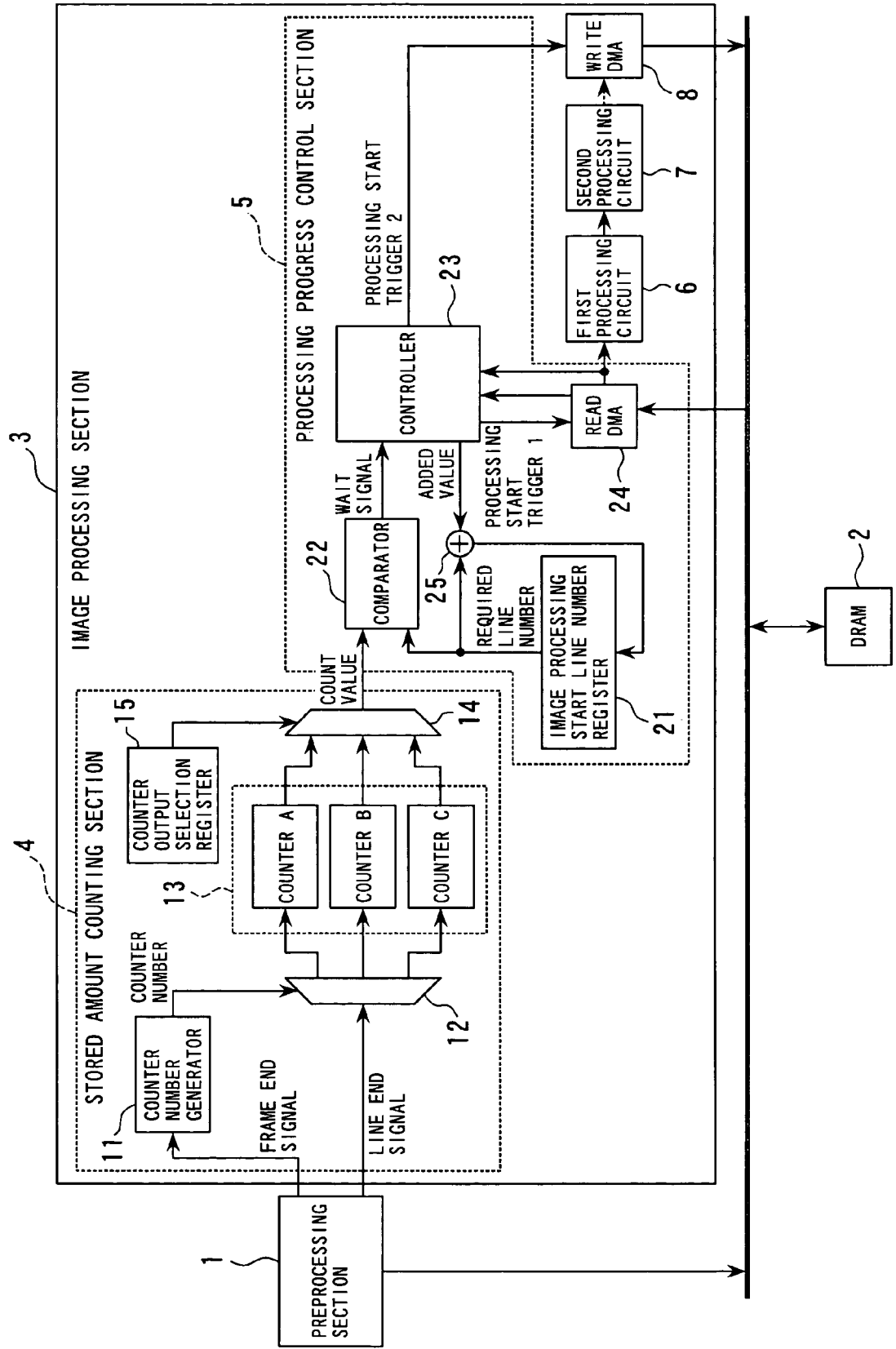
FIG. 3 is a block diagram showing a main portion of an embodiment of the image processing apparatus according to the invention.

An embodiment of the present invention will now be described. FIG. 3 is a block diagram showing a main portion of an embodiment of the image processing apparatus according to the invention with omitting an imaging device, display section and CPU in the case of applying this image processing apparatus to an imaging apparatus. In FIG. 3, numeral 1 denotes a preprocessing section for preprocessing image data acquired by an imaging device such as CCD. It then provides line end signals at each completion of the transmitting of one line of preprocessed image data to DRAM 2 and provides frame end signals at each completion of the transmitting of one frame of the image data to DRAM 2.

Referring to FIG. 3, numeral 3 denotes an image processing section including: a storage amount counting section 4; a processing progress control section 5; a plurality of processing circuits (first and second processing circuits 6, 7 in the illustrated example); and write DMA circuit 8. The storage amount counting section 4 includes: a counter number generator 11 for generating a counter number based on the frame end signals; a plurality of counters (counters A, B, C in the illustrated example) 13 for counting the line end signals; a first selector 12 for causing the line end signals to be outputted to a counter 13 corresponding to the counter number from the counter number generator 11; a counter output selection register 15 to be set by CPU; and a second selector 14 for selecting and outputting a counter value of the plurality of counters 13 corresponding to the register value at the counter output selection register 15.

The processing progress control section 5 includes: an image processing start line number register 21; a comparator 22; a controller 23; read DMA 24; and an adder 25. The comparator 22 compares the register value in the image processing start line number register 21 with a count value of the counters 13 selected and outputted through the second selector 14 to generate and output a wait signal. The controller 23 generates a processing start trigger 1 to be inputted into read DMA circuit 24 for image processing and a processing start trigger 2 to be inputted into write DMA circuit 8 based on the value of the wait signal from the comparator 22 and the current image processing status. The adder 25 adds together an added value outputted through the controller 23 and the register value in the image processing start line number register 21 to set an image processing start line number of the next image processing to the image processing start line number register 21.

Figure 4:
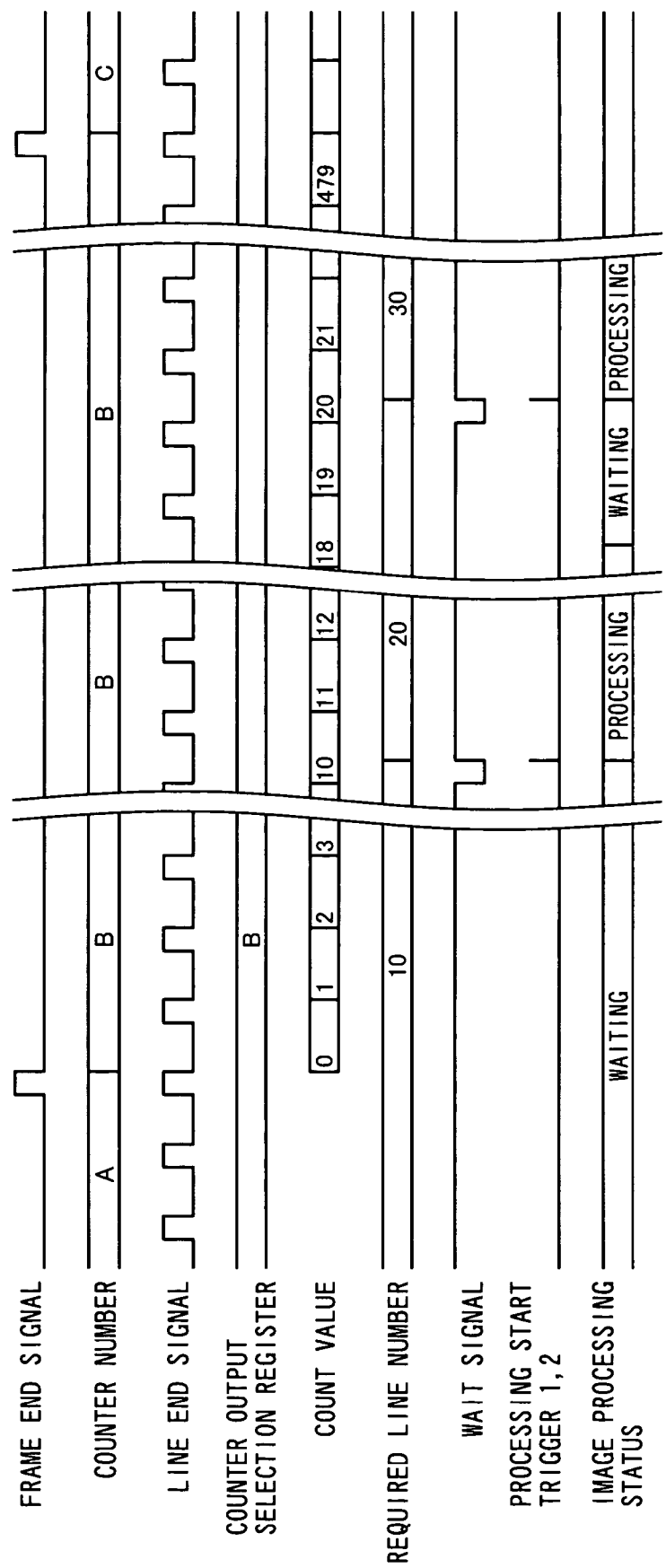
FIG. 4 is a timing chart for explaining operation of the embodiment shown in FIG. 3.

An operation of thus constructed image processing apparatus will now be described with reference to the timing chart shown in FIG. 4. In the image processing section 3 when it is to be initially started, the wait signal from the comparator 22 is at High level so that the progress of the image processing is in the waiting status. Upon start of imaging, every time when image data corresponding to one line has been stored into DRAM 2 from the preprocessing section 1, a line end signal is outputted and is counted by the counter A through the first selector 12. The count number at the counter corresponds to the line number stored into DRAM 2 from the preprocessing section 1. When image data corresponding to one frame has been stored into DRAM 2 from the preprocessing section 1, a frame end signal is provided and inputted into the counter number generator 11. A counter number (counter number B in the illustrated example) is thereby outputted from the counter number generator 11 so that the first selector 12 is controlled and the line end signals of the next frame are counted by the counter B. Thereafter, the counter to be used is circularly changed from one frame to another. It should be noted that the timing chart in FIG. 4 mainly illustrates the manner in which counter number B is outputted and the line end signals are counted by the counter B.

Next the count value in the counter (count value in counter B in the illustrated example) is selected by the second selector 14 in accordance with the register value (register value B in the illustrated example) of the count output selection register 15 to be separately set by CPU and is outputted to the comparator 22 of the processing progress control section 5. At this time, a line number (required line number: 10 lines in the illustrated example) required by the image processing section 3 for one time of image processing is being set in the image processing start line number register 21. Thus the required line number set at the image processing start line number register 21 and the count value outputted from the counter 13 of the stored amount counting section 4 are compared with each other at the comparator 22. If the count value of the counter 13 is smaller than the required line number, the comparator 22 outputs a High level wait signal so as to cause start of the image processing to wait.

When the count value in the counter 13 has attained the required line number or above, since the image processing becomes possible, the wait signal from the comparator 22 becomes Low level and the waiting status is removed. The image processing is then started such that, to the read DMA circuit 24 within the processing progress control section 5 and write DMA circuit 8 within the image processing section 3, the processing start trigger 1 and processing start trigger 2 for triggering their transmitting operation are respectively sent from the controller 23. In particular, image data is read out from DRAM 2 through the read DMA circuit 24 and is subjected to predetermined image processing such as YC generation and resizing at the first and second processing circuits 6, 7. The image data after the image processing is then stored into DRAM 2 through the write DMA circuit 8. Also at the same time of the start of the image processing, the register value is updated of the image processing start line number register 21 to be described be low in detail. Upon the completion of the image processing, i.e., completion of DMA transmission of a predetermined line number (10 lines in this example), the image processing section 3 is brought into its waiting status.

The updating of the register value of the image processing start line number register 21 is done by accumulating the line number required for the next image processing (10 lines in this example) to the current register value (required line number) with the adder 25. In a method for setting the line number to be added, the value to be added is previously stored into DRAM 2 for each unit of the image processing. Such value to be added is read out through the read DMA circuit 24 and is cumulatively added at the adder 25 via the controller 23. It should be noted that the updating of the register value of the image processing start line number register 21 is not limited to the above described technique. For example it is also possible to use a technique in which a value to be added is set from CPU and such addition value is cumulated at each image processing.

As the above, the image processing of one frame is complete by sequentially cumulating line numbers required for the next image processing and repeating the execution of the divisional image processing. During this course, divisionally processed image data are transmitted to the display section to start displaying operation thereof every time when the image processing of each divisional image (10 lines in this example) has been complete. The displaying with a reduced time lag thereby becomes possible. It should be noted that a single counter may be repeatedly used if image of one frame such as a still picture is to be processed.

If the image of the next frame is to be consecutively processed as in the case of a moving picture, on the other hand, the next counter number (counter number C in the illustrated example) is outputted from the counter number generator 11 based on the frame end signals, thereby the line end signals are counted by counter C through the first selector 12. Correspondingly to this, the register value of the counter output selection register 15 is set so that the count value of counter C is selected and outputted by the second selector 14. At the same time, the image processing start line number register 21 is initialized to continue similar processing again. In this manner, the image processing of consecutive frames can be sequentially executed without omitting line number.

Figure 1A:
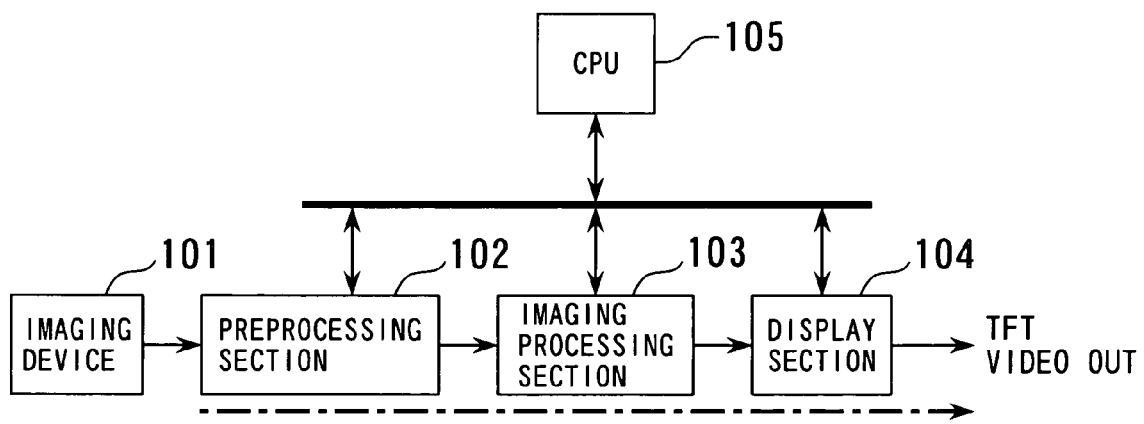
FIGS. 1A and 1B each are a block diagram showing an example of the conventional image processing apparatus.
Figure 1B:
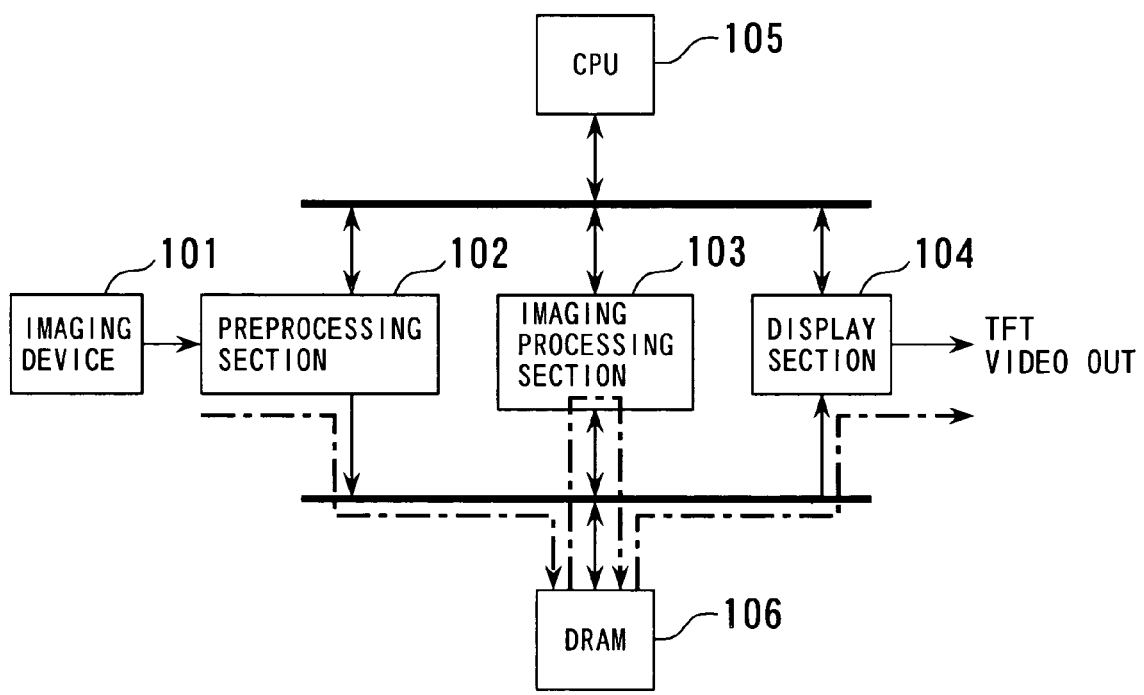

As the above, the image processing apparatus according to the present embodiment is to divide image data of one frame and process image by the divisional image data unit in a similar processing procedure as the image processing in the conventional image processing apparatus shown in FIG. 1B. Unlike the conventional image processing apparatus, however, it is characterized in that the image processing apparatus according to the present embodiment is formed in the above described special construction so that the processing mode shown in FIG. 1B can be executed by hardware without control by CPU. It makes possible an image processing that conforms to narrowly blocked outputs of the preprocessing section without control by CPU. As a result, an extremely large line memory is not required and, without putting load on CPU, time lag in the displaying of taken image for example can be reduced.

While one provided with three counters for counting the line end signals has been shown in the above embodiment, the number of counters is not limited to three. Further, the counter is not necessarily be provided in a plurality of units for example when only still pictures are taken, and it is possible to have only one unit. In this case, the first and second selectors or the like become unnecessary.

As has been described by way of the above embodiment, with the image processing apparatus according to the first aspect of the invention, an image processing can be effected with conforming to amount of image data stored in a memory without control by CPU so that time lag in displaying the taken image can be reduced without putting load on CPU. With the image processing apparatus according to the second to sixth aspects, the image data amount stored in a memory can be detected with using each line as a unit so that image processing can be effected with conforming to a narrowly blocked image data amount. With the image processing apparatus according to the seventh and eighth aspects, the image data amount stored in a memory can be detected by the line for a plurality of consecutive frames without omitting a line number. With the image processing apparatus according to the ninth and tenth aspects, the progress of image processing can be caused to wait by the processing progress control section until the storing of image data necessary for the image processing into a memory so that it is possible to efficiently effect image processing in narrowly blocked units. With the image processing apparatus according to the eleventh aspect, the progress of image processing can be caused to wait until the storing of image data of a given number of lines into a memory for each image processing unit so that the image processing can progress efficiently.

What is claimed is:

1. An image processing apparatus having a memory storing taken image data, for effecting image processing on said stored image data, said image processing apparatus comprising:
   an image data storage control section for outputting line end signals every time the image data for one line is completely transferred to said memory when storing said taken image data into said memory by the line; and
   an image processing section including a stored amount counting section for counting amount of said taken image data stored into said memory by counting said outputted line end signals, and a processing progress control section for controlling the start and a wait of said image processing based on the stored amount counted at the stored amount counting section,
   wherein said stored amount counting section has a plurality of counters for counting said line end signals.

2. The image processing apparatus according to claim 1, wherein said stored amount counting section uses one counter among said plurality of counters when taking a still image and uses said plurality of counters with sequentially switching from one to another between each frame when taking a moving image.

3. The image processing apparatus according to claim 2, wherein said image data storage control section is further formed so as to output frame end signals to said stored amount counting section every time the image data for one frame is completely transferred to said memory,
   wherein said stored amount counting section further comprises: a counter number generator receiving and counting said frame end signals, for generating and outputting a counter number for designating a counter to be used from among said plurality of counters;
a first selector selecting the counter for counting said line end signals based on the designation of said counter number, for inputting said line end signals into said selected counter; and
a second selector for selecting one among the outputs of said plurality of counters as a count value based on a register value of a counter output selection register to be set by a CPU.

4. The image processing apparatus according to claim 3, wherein, by comparing the count value of said counter with the line number of an image data required for image processing, when said count value is smaller than said required line number, said processing progress control section outputs a wait signal and delays start of the image processing, and if said count value reaches said required line number, said processing progress control section controls the progress of the image processing by releasing the wait state and starting the image processing.

5. The image processing apparatus according to claim 4, said processing progress control section further comprising: an image processing start line number register for retaining an image line number required for said image processing; a comparator comparing said count value with said image line number required for the image processing, and an image processing start line number register updating section for updating said image processing start line number register by setting an added value of the image line number required for the next image processing with the current register value indicating the required current image line number at a new register value;
   wherein the progress of the image processing being controlled based on said wait signal.

6. The image processing apparatus according to claim 5, wherein said image processing start line number register updating section comprises: a memory read section for reading data showing the image line number required for the next image processing stored into said memory; and an accumulating section for adding together the image line number read out by the memory read section and the image line number required for the current image processing provided as the current register value of said image processing start line number register and rewriting the added data to said image processing start line number register.

* * * * *